Fig. 14

Patented Nov. 5, 1935

2,019,946

UNITED STATES PATENT OFFICE 2,019,946

PROCESS AND APPARATUS FOR THE MANUFACTURE OF ENVELOPES, BAGS, AND SIMILAR ARTICLES

Alfred Winkler and Max Dünnebier, Neuwied, Germany

Application March 28, 1935, Serial No. 13,510
In Germany March 28, 1934

34 Claims. (Cl. 93—62)

The invention relates to a method and an apparatus for the manufacture of envelopes, bags and other articles, which are prepared from blanks or other sheets of such a nature as to require the application of adhesive substance on both sides. The method and the apparatus according to the invention are adapted especially for the production of envelopes, bags and similar articles to which so-called dry-gumming or auto-adhesion is applied. This always consists of two coatings of a particular adhesive substance and adhesion is obtained, without previous moistening, simply by pressing the two adhesive coatings one upon the other. An envelope provided with dry gumming of this kind, as described, for instance in Patent 481193, requires for its rational production, that the blank from which it is to be prepared be furnished with the two coatings of adhesive substance before the envelope is folded. Since, however, these cuttings are distributed on both side faces of the blank, their production in a single operation cannot be effected by means of the adhesive applying devices known heretofore.

According to the process of the invention, the application of the adhesive substance to both sides of the blank or other sheet is rendered possible by a layer or pile of sheets, formed, in a manner known per se, by sheets stepped one over another and one beyond another, being conveyed successively to two different adhesive applying devices, one of which provides a coating of adhesive on the exposed parts of sheet surfaces which together form a continuous surface on one side of the pile of sheets while the other provides a like coating on the similarly exposed surfaces on the other side of the said pile. Naturally, in view of the fact that the direction of feed of the pile of sheets is always the same, it is not possible to prevent that surface portion of each sheet which has not to be served with adhesive from lying—having regard to the direction of feed—under the one adhesive applying device in front of the surface portion which receives the adhesive and under the other adhesive applying device behind the surface portion which receives the adhesive, so that, in the latter case, the outer edge of the surface to be provided with adhesive lies ahead in the direction of motion and is the first to come beneath the adhesive applying device. Notwithstanding this, however, special measures, in accordance with the invention and hereinafter more particularly described, permit of faultless application of the adhesive substance.

The fundamental characteristic of the apparatus according to the invention is observable in the fact that the feed means, which picks up the stepped pile of sheets and carries it along under a device which applies the adhesive to the exposed surface parts of the sheets on one side of the said pile, passes the pile of sheets to a second feed means, which is so guided in its complete path of travel that these surface parts of the sheets which, being on the other side of the pile, have not yet been served with adhesive are made accessible to a second adhesive applying device. This second feed means is, in known manner, driven somewhat faster than the first one, thereby effecting a slight drawing apart of the stepped sheets and preventing them from sticking together.

The adhesive employed for the aforesaid dry gumming or auto-adhesion does not permit of the use of the devices which have hitherto been used for applying adhesive according to the known wipe-on process, for, by reason of the consistency of this adhesive, a satisfactory result cannot be obtained with it. The wipe-on gumming process, per se, in the form usual heretofore, is applicable at that point of the arrangement according to the invention where the exposed surface parts not to be served with adhesive of the individual sheets contained in the pile of sheets lie advanced in the direction of motion, so that the outer edges of those parts of the sheet surfaces which carry the coating of adhesive emerge last from the adhesive and applying device. Thus the relatively mobile adhesive used for dry gumming when it comes into contact simultaneously with a relatively large surface of the stepped pile of sheets, as is the case with other adhesive applying devices for wipe-on gumming, flows down over the pile of sheets, which always lies at a sharp inclination, and is dammed at the edges of the individual blanks or sheets, so that thickened ridges of adhesive form at these points. According to the invention there is used for applying, by the wipe-on process, the adhesive employed for dry gumming, an adhesive container having only a narrow slit for the exit of the adhesive. At this slit it rests close against the stepped pile of sheets, so that only such quantity of adhesive as is absolutely necessary is served to the blanks.

A wipe-on gumming device of the type last herein described cannot be used also as the second adhesive applying device beneath which the stepped pile of sheets is fed along in such a way that the parts of the sheet surfaces which receive the adhesive lie advanced in the direction of motion, since those edges of the blanks which lie in advance in the direction of motion would collide with the closely contacting edge of the adhesive container. This second adhesive applying device therefore consists essentially of an adhesive container, a dipper roll and an applier roll, which takes up adhesive from the dipper roll and applies it to the blanks. Adhesive applying devices of this kind are already known per se but the distinguishing features according to the invention, in the device here employed are recognizable as follows:—

On the one hand the drive of the device is so effected that the applier roll, on that side of it which confronts the pile of sheets, has a direction of rotation opposed to the direction in which the sheets are fed. On the other hand, there is arranged over the dipper and applier rolls a third roll, which functions as a scraper roll and permits of exact regulation of the thickness of the layer of adhesive to be applied by the applier roll to the blanks. This third roll rests on the dipper roll all the time and is driven from the latter, either directly, by the adhesion of the adhesive substance, or through a spur wheel transmission. It is, however, adjustable in relation to the applier roll and has the same direction of rotation as this latter. Thus according to its adjustment, it takes off more or less adhesive from the circumference of the applier roll before the latter comes into contact with the stepped pile of sheets.

In order that, even when the machine is temporarily shut down, the applier roll, which together with the dipper roll, must, in such circumstances continue to run, so that the adhesive upon it may be prevented from setting, may be lifted from the stepped pile of sheets, the whole adhesive applying device is arranged on a swingable pair of levers or in some other suitable manner and, by appropriate means, is so coupled with the shut-down arrangement for the whole machine that when the latter is shut down the applier roll is automatically raised from the pile of sheets.

For the drive of the adhesive applying device last described, measures are adopted, as already explained, which permit of its rolls continuing to rotate even when the whole machine is shut down, so that setting of the adhesive on the rollers may be avoided.

For the direct production of finished envelopes or bags with dry gumming, starting from a stack blanks, there is provided, according to the invention, a device which removes individual blanks from a stack and arranges them in a stepped pile of sheets in front of the feed means which transfers the pile of sheets herefrom and conveys them along under the first adhesive applying device and, further on, there connect with the feed means which carry the pile of sheets along under the second adhesive applying device further feed means and a folder device which takes over the sheets from the latter.

For the direct production of printing on one or both sides of the blank, the invention includes the incorporation, between the device which removes the blanks from a stack and piles them and the feed means which carries the pile of sheets along under the first adhesive applying device, of arrangements, of a kind known per se, which function to pull out the individual blanks from the stepped pile of sheets, to straighten the individual blanks, to print on one or both sides and to rearrange them in a stepped pile of sheets.

A further feature of the invention is the incorporation between the device which straightens the blanks and the printing device of an arrangement for producing raised embossing on the blanks.

Since, in certain kinds of envelopes or bags provided with dry gumming it is necessary to apply a strip of adhesive to the outer surface of the blank at its upper edge, which confronts the closing flap, said back part having to be folded back in the manner of a flap in order to prevent it from sticking to the turned over closure flap which is also served with adhesive; a final feature of the invention consists in arranging between the means which straightens the individual sheets before they run into the folder device and the actual folding device itself, a device which functions to fold back the flap of the back part of the blank, which flap carries the coating of adhesive. This consists of a breaker roll, with a counter roll, which pre-breaks the fold or crease of the flap, a suction roll co-acting with a counter roll and picking up the blank behind the pre-broken crease in the latter and a folder rail which turns over the flap before it runs in between the suction roll and its counter roll.

In the accompanying drawings is a showing for the purpose of explaining the method according to the invention and examples of blanks or work pieces and also a constructional example of an apparatus in accordance with the invention. In these drawings.

Figure 1:
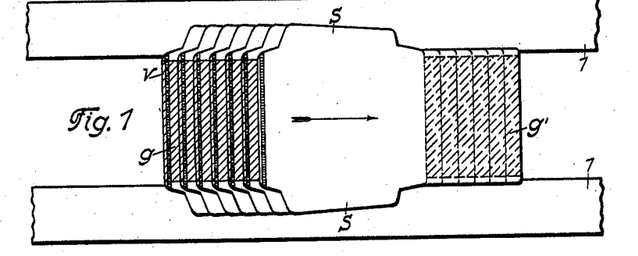
Fig. 1 shows the stepped arrangement of the work pieces, the latter being assumed to be envelope blanks.
Figure 2:
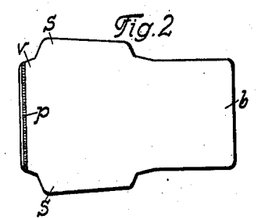
Figs. 2–12 show the working stages or operations in the production of an envelope provided with dry gumming on both sides of the blank.

Fig. 1 shows a plurality of stepped blanks which, in the region of their side flaps s are firmly engaged by and advanced between pairs of conveyor belts t, shown in broken lines. Having regard to the most advantageous sequence of the working operations, it is assumed that the feed and the travel of the belts takes place in the direction of the arrow. According to the method of the invention and assuming that envelopes according to Figs. 2–13 are to be produced and provided with dry gumming, the adhesive of the closure flap $v$ is applied on the side of the blank which is turned towards the observer while the associated counter adhesive, on the other hand is applied to the edge of the bottom flap $b$ on the opposite side of the blank, these two applications being effected in one operation. Accordingly the coating of adhesive on the closure flap in Fig. 1 is shown hatched in full lines and the coating of adhesive on the edge of the bottom flap hatched in broken lines. From this figure it can also be seen that the outer edges of the closure flaps lie to the rear relatively to the direction of motion while the outer edges of the bottom flaps on the contrary, lie advanced in the direction of motion.

Figure 14:
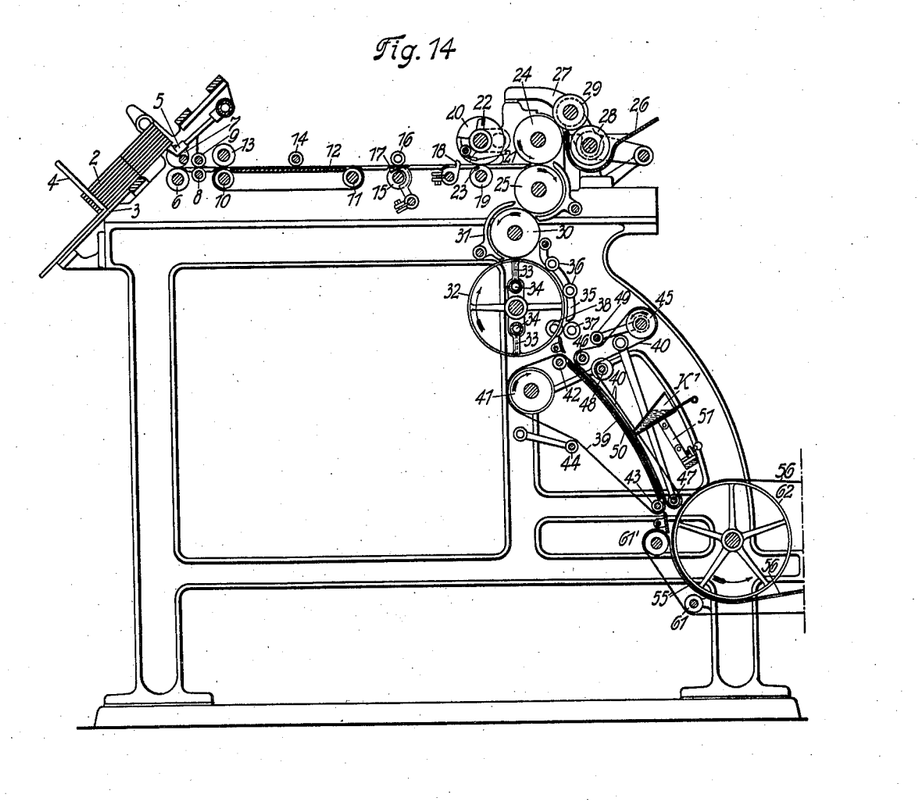
Figs. 14, 15 and 16 when arranged in series one beyond another, in accordance with the dot and dash lines, constitute a general arrangement view of the apparatus in side elevation.
Figure 15:
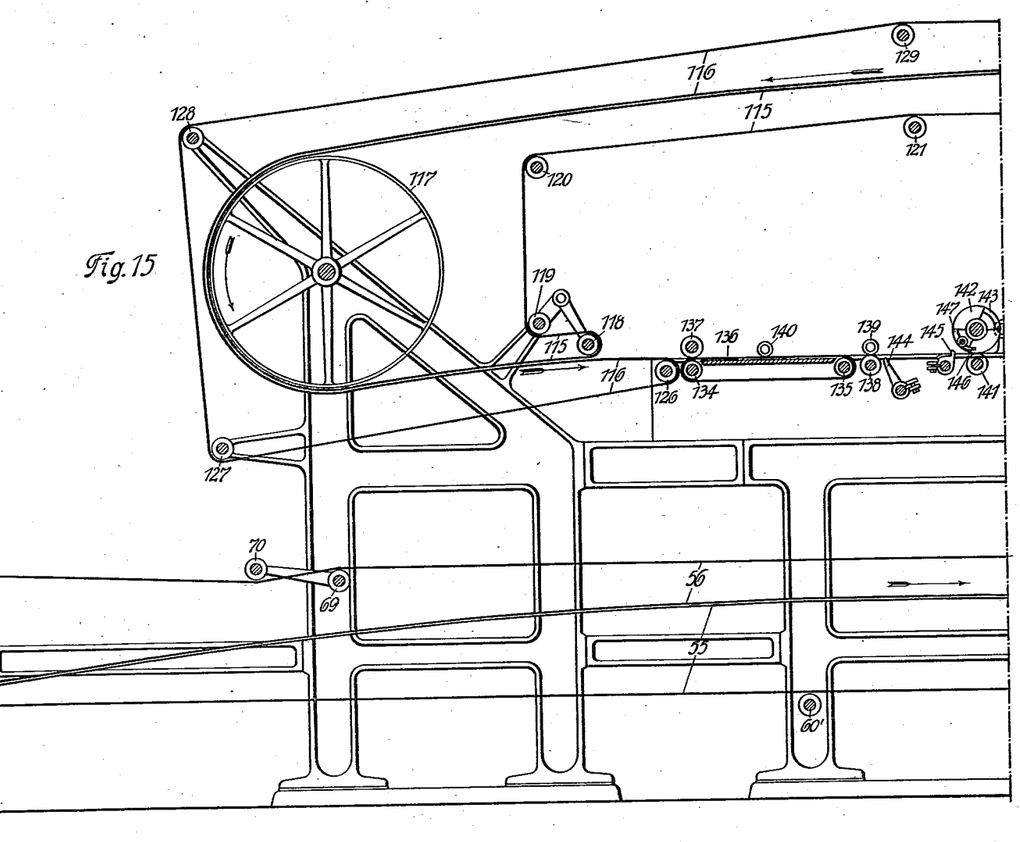
Figure 16:
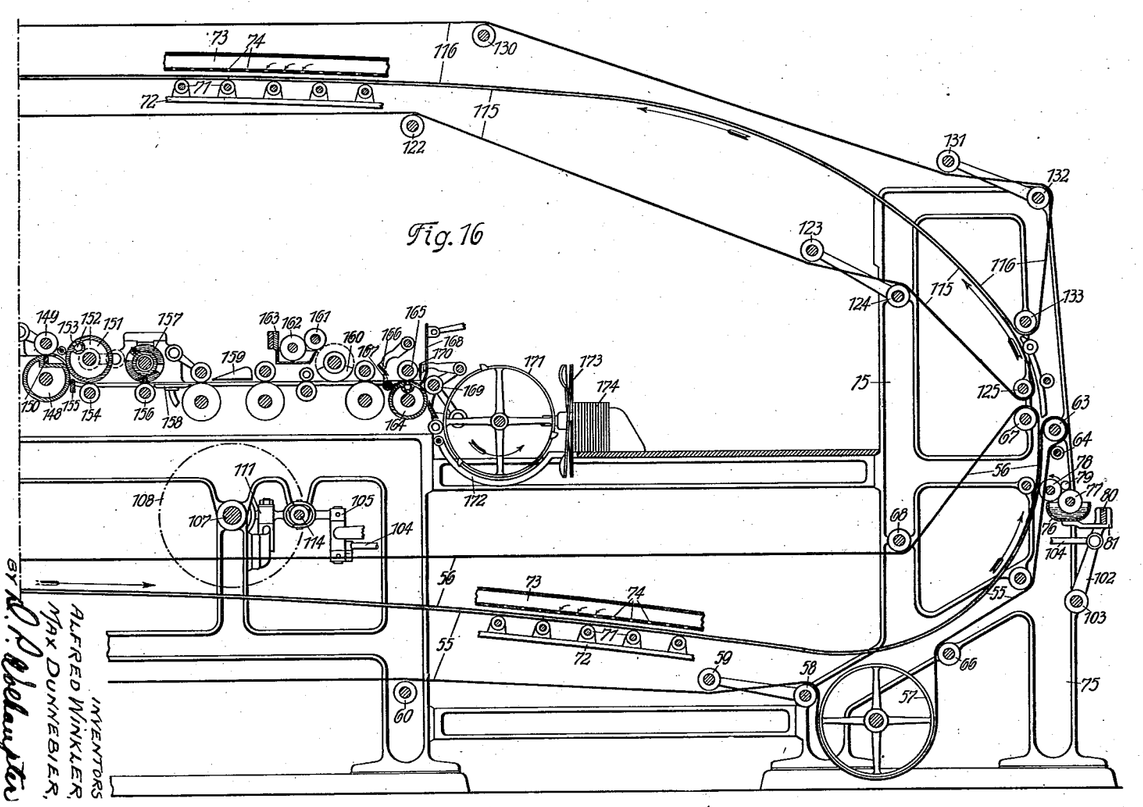

As a practical example a complete apparatus according to the invention is depicted in Figs. 14, 15 and 16 this apparatus permitting of all the operative steps required for producing an envelope with dry gumming according to Figs. 2–13. In describing the whole apparatus hereinafter reference is made from time to time to the operative steps shown in the figures last mentioned. Attention is, however, directed here and now to Fig. 13 which shows the finished envelope in section and discloses both the folded over closure flap $v$ and also the folded over flap $b'$ of the bottom flap $b$. Both the flaps $v$ and $b'$ carry the coating of adhesive on their inner sides. In order to close the envelope the flap $b'$ is turned up under the flap $v$ and the latter laid over it and pressed on to it. From this it will be seen that the coating of adhesive on the closure flap $v$ must be on one side of the unfolded blank while that of the flap $b'$ must, on the contrary, be on the other side.

The structure of the apparatus according to Figs. 14, 15 and 16 and the manner in which it works are as follows:—

Figure 3:
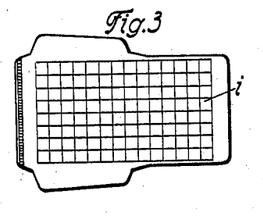
Figure 4:
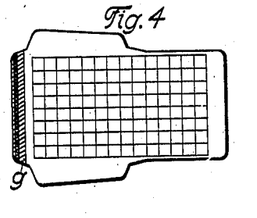

A stack of blanks 2 is carried by the stack table 3 (Fig. 14) and is kept in place by the adjustable stops 4. By means of the oscillating suction device 5, working in conjunction with other means, which are not shown in the drawing on account of their secondary importance so far as the present invention is concerned the blank which at the moment is lowermost in the stack 2 is brought between the intermittently driven pair of rolls 6, 7, so that directly between these there is formed a pile of sheets made up of the blanks, stepped one above and behind another, this pile being taken over by the pair of rolls 8, 9 and guided on to the pair of conveyor belts 12, which run on the two rolls 10 and 11, and with which co-act a fixed roll 13 and an adjustable roll 14. The roll 14 is so adjusted in accordance with the size of sheet to be worked, that it releases that blank which, for the time being is foremost in the stepped pile of sheets as soon as it is engaged by the faster running pair of rolls 15, 16 which withdraw it completely from the stepped pile of sheets and, in known manner, present it to the pair of straightening fingers 17 and 18. The latter straighten the blank accurately by its four inspringing corners. The straightened blank is taken over by the pair of rolls 19, 20. Of these, the upper roll 20 is made segmental and is furnished with a pivoted flap 21, which ensures absolutely exact and instantaneous engagement of the straightened blank. In addition the roll 20 carries an embossing matrix 22, which, in conjunction with an insert 23 in the counter roll 19, produces a raised embossed pattern $p$ in the edge of the closure flap $v$ of the blank, as is shown in Figs. 2–12. The blank leaves the pair of rolls 19, 20 in the condition shown in Fig. 2 and comes then between the platen cylinder 24 and the printing cylinder 25 of a printing mechanism, which, in the example shown in the drawings is shown as an aniline printing press. The colour trough is designated 26 and its dipper and colour rolls 28 and 29 are mounted on the pair of pivoted levers 27. The printing mechanism shown in the drawings is used to produce an inside imprint $i$ on the blanks. Fig. 3 corresponds to the blank as it runs out from between the platen and printing cylinders 24, 25, provided with the inside imprint $i$. The printing cylinder 25 and a counter cylinder 30, co-acting therewith, deliver the blank, beneath guides 31, to the suction discs 32, having diametrically opposed suction openings 33 extending outward from suction passages 34. Under the action of known pneumatic suction control devices, not shown in the drawings, the suction discs 32 engage each blank with their suction openings 33 and conduct it under the guides 35 and the counter rolls 36 and between the rolls 37 and 38 which are driven so slowly that by these means the blanks are again put in stepped formation, in such fashion that the stepped spacing of the edges of the blanks corresponds exactly to the desired width of the coating of adhesive to be applied to the closure flap $v$. In this stepped condition the blanks enter between the pairs of conveyor belts 39 and 40. The pair of conveyor belts 39 is driven by the drum 41 and also runs over the rolls 42 and 43 as well as over the tensioning roll 44. The pair of conveyor belts 40 takes its drive from the drum 45 and is guided over the rolls 46, 47, 48 and the tensioning roll 49. Both pairs of conveyor belts 39 and 40 run over the arched table 50 with their confronting runs lying one on top of the other.

Figure 20:
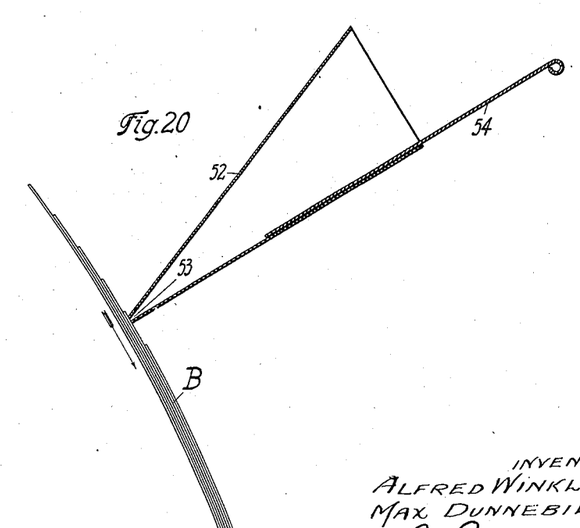
Fig. 20 is a vertical section through the adhesive applying device, which operates according to the customary wipe-on system.

On their way through the pairs of conveyor belts 39, 40 the stepped blanks receive the coating $g$ of adhesive on their closure flaps $v$, from the adhesive applying device $K^1$, which is fastened to a pivoted frame 51, so that it can be lifted from the pile of sheets in case of need. The adhesive applying device $K^1$ consists of a container 52 (Fig. 20), closed on four sides, which runs off into a narrow slit 53, which rests close against the stepped pile of sheets. By means of a slide 54, guided in the adhesive container 52, the slit 53 can be closed. The said slit is so dimensioned as not to permit a greater quantity of adhesive to emerge from the container 52 than is necessary for obtaining a regular and satisfactory adhesive coating.

Running out between the rolls 43 and 47 from the pairs of conveyor belts 39, 40, the stepped blanks enter between the pairs of conveyor belts 55 and 56. The drum 57 drives the pair of conveyor belts 55, which is further guided over the rolls 58, 59, 60, 60', 61, 61', around a part of the drum 62 and over the further rolls 63, 64, 65 and 66. The roll 59 functions as a tensioning roll. The pair of conveyor belts 56 is driven by the drum 62 and runs over the rolls 67, 68, 69, over the tensioning roller 70 and back to the drum 62. The runs of the pairs of conveyor belts 55 and 56 which confront each other are, along their common path from the drum 62 to the roll 63 guided over an arched frame 72 which conforms to the double curved line in the drawings and upon which guide rolls 71 are arranged. For the sake of greater clearness, however, only a small part (Fig. 16) of this frame is shown in the drawings. Above the roller frame 72 and the belts 55, 56 running one on top of the other, is fixed a hot air-duct 73, which, in that wall of it which is turned towards the belts and, therefore, towards that surface of the pile of sheets which is furnished with adhesive, has openings 74, through which the hot air, drawn from any desired source, is blown on to the coating of adhesive on the pile of sheets for the purpose of accelerating the drying of the adhesive coating. The pairs of conveyor belts 55, 56 are driven a little faaster than the pairs of conveyor belts 39, 40, so that the stepped spacing of the blanks is slightly increased when they are transferred to the belts 55, 56 and the closure flaps, provided with adhesive are prevented from sticking together at their edges.

Figure 17:
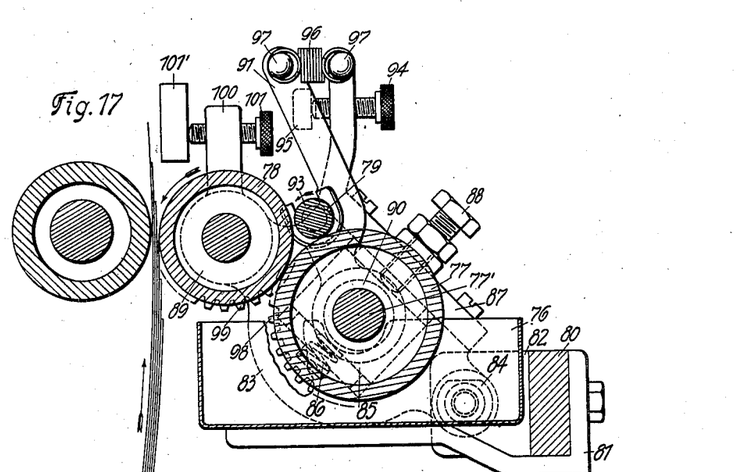
Fig. 17 is a vertical cross-section through the adhesive applying device beneath which travels the pile of sheets with those parts of the sheet surfaces which receive the adhesive advanced in the direction of its motion.
Figure 18:
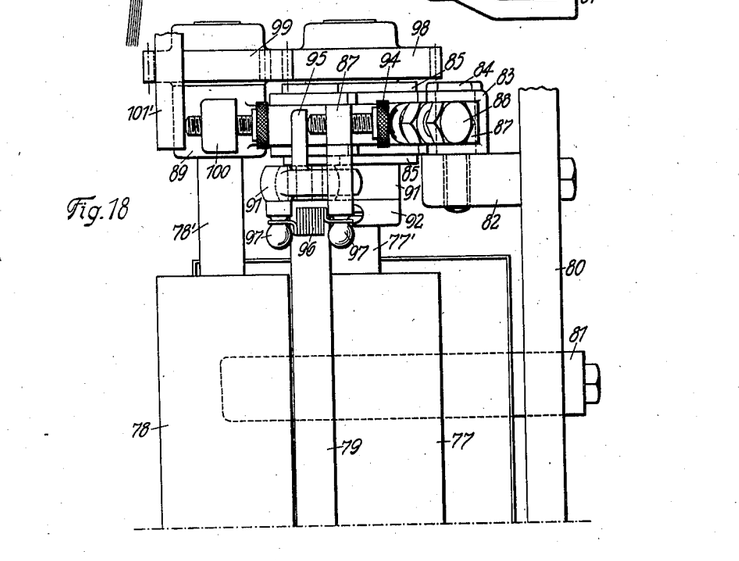
Fig. 18 is a fragmentary plan view of the adhesive applying device according to Fig. 17.

Within the upwardly directed common run of the pairs of belts 55, 56 between the frame parts 75 (Fig. 16) is arranged the second adhesive applying device K² which, consequently, is directed towards that surface of the stepped pile of sheets which has not yet been furnished with adhesive. Beneath this adhesive applying device K² the stepped blanks travel past with the outer edge of the part b' of the bottom flap to be provided with adhesive, lying advanced in the direction of their motion. The device consists essentially of the adhesive container 76, the dipper roll 77, running therein, the applier roll 78 driven by the latter and resting upon it and the small roll 79 arranged over the two rolls 77 and 78. The driving of this adhesive applying device K² is effected independently of that of the machine as a whole, so that, as indicated by the arrows in the drawings, the applier roll 78, on that side thereof which confronts the superimposed pairs of belts 55, 56 and the stepped pile of sheets in between them, has a direction of rotation opposed to the movement of the conveyor belts. The adhesive applying device K² is shown on a larger scale in Figs. 17 and 18. The device as a whole is mounted on a rail 80. On the rail 80 are screwed two arms 81 which carry the adhesive container 76 and two lugs 82 for fixing the bearing member 83 for the dipper and applier rolls 77 and 78. Bolts 84 serve for attaching the bearing member 83 pivotally to the lugs 82. The dipper roll 77 runs in two bearing blocks 85 each guided in a slideway in the bearing member 83 and each pressed by a compression spring 86 against an adjusting screw 88 provided on the bridge-piece 87 of the bearing member 83. The applier roll 78 is rotatable in fixed bosses 89 one on each of the bearing members. By means of the adjusting screw 88 the dipper roll 77 can be adjusted in relation to the applier roll 78. On the sides thereof which are turned towards the rolls 77 and 78 the bearing blocks 85 have each a trunnion 90 and on these trunnions a pair of levers 91 is rotatably fixed, each being secured by a locating collar 92. In forked parts 93 of the levers 91 the roll 79 is so mounted that it rests close against the dipper roll 77. By pivoting its bearing levers 91 about the trunnions 90 of the bearing blocks 85 it can be brought up to or removed from the applier roll 78. For the adjustment of the roll 79 the adjusting screws 79¹ are used, these being located each in an upwardly bent prolongation of the bridges 87 and a lug 95 fixed on the bearing lever 91 being held in contact with each of them by a tension spring 96. The tension springs 96 are secured to spring knobs 97 fitted respectively to the free ends of the prolongation of the bridges 87 and to the bearing levers 81.

The driving means for the adhesive applying device K² are not shown in the drawings, nor are all the other driving means for the machine as a whole, as it can be presupposed that they are known and of no importance so far as the present invention is concerned. The drive for the adhesive applying device K² is effected independently of the drive for the machine as a whole on the dipper roll 77, since when the whole machine is temporarily brought to rest, the rolls of the adhesive applying device must continue to rotate, in order to prevent setting of the adhesive present on their surfaces. Through the two spur wheels 98 and 99, which are fixed on the shafts 77' and 78' of the dipper roll 77 and the applier roll 78, respectively, the latter is driven, and the drive is so effected that the direction of rotation of the applier roll, as already mentioned, on the side thereof which rests against the pile of sheets B, is opposed to the direction of movement of said pile of sheets. The opposed motions are also shown by arrows in Fig. 17. The roll 79 has the same direction of rotation as the applier roll 78. The driving thereof can be effected from the dipper roll either by the adhesion of the adhesive present thereon, as is assumed in the drawings, or through a spur wheel transmission. The roll 79 serves for measuring accurately the amount of adhesive which remains on the applier roll 78 and is given up by the latter to the stepped pile of sheets, this not being possible solely by adjusting the dipper roll 77 relatively to the applier roll 78 especially in the particular case in which adhesive for dry gumming is employed. For the adjustment of the adhesive applying device K² as a whole, that is to say for regulating the applier roll 78 to more or less close contact with the pile of sheets B adjusting screws 101 arranged each in one of the lugs 100 of the bearing members 83 are used, these screws bearing against fixed stop rails 101'.

Figure 19:
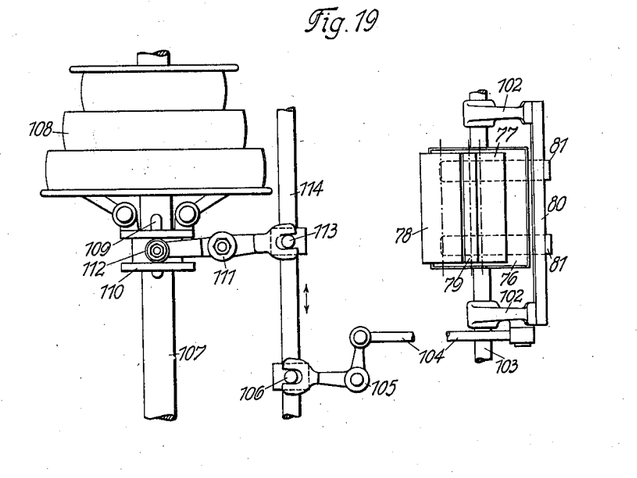
Fig. 19 is a plan view of an arrangement for lifting the adhesive applying device according to Figs. 17 and 18 from the pile of sheets, said arrangement being coupled to the shut down or uncoupling device for the whole machine

Since when the machine as a whole is temporarily brought to rest, and with it, the pairs of conveyor belts 55, 56 and the pile of sheets between the same, the continuously rotating applier roll 78 ought not to remain in contact with the pile of sheets if smearing of the blanks is to be avoided, there is provided, according to the invention, a device by means of which the adhesive applying device K² is automatically lifted from the pile of sheets B and again brought into contact with said pile, when the machine as a whole is brought to a standstill and set going again. For this purpose, in the example shown in the drawings, the rail 80 which carries the adhesive applying device K² is arranged on a pair of levers 102, fixed to a shaft 103 which is rotatable in the frame members 75. The one end of a tension rod 104 is pivoted to one of the levers 102, the other end of this rod engaging one arm of a bell-crank lever 105. The other arm of the bell-crank lever 105 has a forked end which is guided on a pin 106 arranged on an element of any preferred kind, which moves when the machine as a whole is coupled and uncoupled. In the example shown in the drawings (Fig. 19) the driving means for the machine as a whole, is assumed to be a stepped pulley 108, running loose on the main driving shaft 107 and associated with a friction clutch. By shifting a collar 110, guided on a key 109 on the shaft 107 in the direction towards the stepped pulley 108 the whole machine is set going and by shifting the collar 110 in the opposite direction the said machine is brought to rest. The shifting of the collar 110 is effected by means of a double armed lever 111. The two arms of the latter are forked; one forked arm thereof is guided, by means of rolls 112 arranged rotatably on it, in a groove in the collar 110 and its other arm is guided on pins 113 which are fixed to the longitudinally movable clutch rod 114. It can be seen directly, from Fig. 19, that downward movement of the clutch rod 114 not only shifts the collar 110 in the direction towards the stepped pulley 108 and thus couples up the machine as a whole, but also has the effect of moving the tension rod 104 to the left and thus causing the adhesive applying device 152 to rest on the pile of sheets B, while on the contrary, when the clutch is withdrawn, that is to say, when the clutch rod 114 is moved upwards, the adhesive applying device K² is lifted from the pile of sheets.

Figure 5:
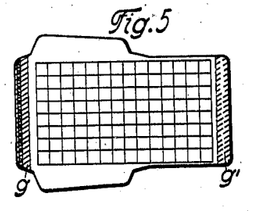
Figure 6:
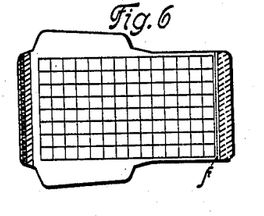
Figure 7:
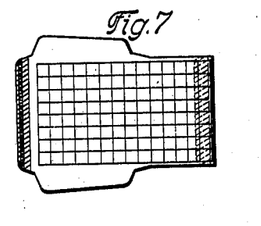
Figure 8:
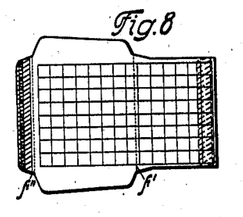

The blanks, running out from the pairs of conveyor belts 55, 56, between the rolls 63 and 67 and now provided on both sides with adhesive coatings $g$ and $g'$, according to Fig. 5, enter between the pairs of conveyor belts 115, 116 which are likewise driven slightly faster than the pairs of conveyor belts 55, 56, so that here again, sticking together of the blanks is prevented. The conveyor belts 115 run over the guide rolls 118, 119, 120, 121, 122, 123, 124 and 125 of which the roll 123 serves as a tensioning roll. The conveyor belts 116, starting from the drums 117, are guided over the rolls 126, 127, 128, 129, 130, 131, 132, 133. Here the roll 131 serves as the tensioning roll. The two confronting and closely superimposed runs of these pairs of conveyor belts 115, 116, where, in the drawings, they are shown simply as double curved lines are also led over correspondingly curved frames 72 furnished with guide rolls 71 as is shown in a fragmentary manner in Fig. 16 at the top thereof. Here again, there is arranged over the runs of conveyor belting which guide the pile of sheets a hot air-duct 73 with out-flow openings 74, for accelerating drying of the adhesive, as hereinabove described.

The stepped blanks, running out from the pairs of conveyor belts 115, 116 at the guide roll 118 are first picked up by the conveyor belts 136 carried over the rolls 134 and 135 and the top roll 137, co-operating with these belts and thence they are passed to the pair of rolls 138, 139, which run faster and which completely withdraw the blank which, for the time being comes foremost in the pile of blanks. In order that this may be possible with all sizes of sheets, an adjustable roll 140 is arranged over the conveyor belts 136, this roll being so adjusted that it releases that blank which for the time being is foremost in the pile of sheets when the said blank is gripped by the pair of rolls 138, 139. The latter carry the blank between the roll 141 and its counter roll 142, which is formed of adjustable segments. With its segment 143 the latter brings up the blank to the pairs of straightening fingers 144 and 145. After these have straightened the blank it is gripped by the pivoted flap 146 of the roll 142 and the flap 146, together with the segment 147, which completes it, conveys the blank to the pair of rolls 148, 149. Of these the bottom roll 148 is furnished with a creasing knife 150, which, in conjunction with a groove provided in the top roll 149, produces a sharp preparatory crease or "break" directly behind the adhesive coating $g'$ of the back part of the blank, this being shown by the dotted line in Fig. 6. By means of the suction roll 151, associated with a pneumatic vacuum control device of known kind and more particularly by means of the suction openings 153 leading to the outer surface of said roll from the suction duct 152, the blank running out from the rolls 148, 149 is now engaged behind the preparatory crease $f$ and fed towards the counter roll 154. Along this path of the blank there is arranged, outside the suction roll at a slight distance therefrom, the folder rail 155. Since the sharp preliminary crease $f$ produces a bending downward of the flap $b'$ (Fig. 13) of the rear part of the blank which lies foremost in the direction of motion and is provided with an adhesive coating $g'$, this bent down flap $b'$ strikes against the folder rail 155, while its fold $f$ runs in between the folder rail 155 and the suction roll 151, so that the flap $b'$ is here completely turned over and then its fold is pressed sharply together between the suction roll 151 and its counter roll 154. The blank has now reached the condition shown in Fig. 7.

Figure 9:
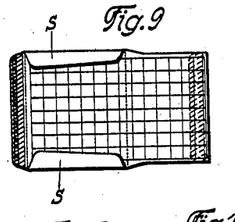
Figure 10:
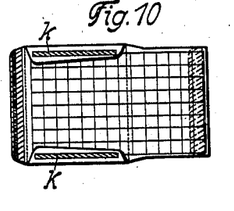
Figure 11:
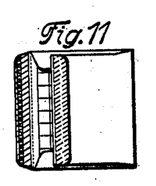
Figure 12:
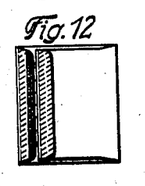
Figure 13:
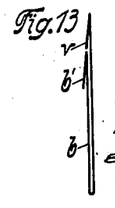
Fig. 13 is a section taken in the direction from the closure flap fold to the bottom fold through an envelope according to Figs. 2–12.

Along the further path of the blank through the rolls of the actual folding device the further working operations for finishing the article take place in known manner and therefore are only indicated briefly herein. Between the pair of rolls 156, 157 the blank receives the preliminary creases $f'$ and $f''$ for the bottom and closure flap folds, according to Fig. 8. By means of the rails 158, swinging in vertical direction, the side flaps $s$ are turned up and by means of the slide 159, moving horizontally, at right angles to the path of the blank, they are folded over as shown in Fig. 9. The segment 160 which receives the adhesive, by way of the applier roll 161 and the dipper roll 162, from the adhesive container 163, carries the strip of adhesive $k$ on to the side flaps $s$ as shown in Fig. 10. Between the pair of rolls 164, 165, by means of the creaser knife 166 the bottom flap $b$ (Figs. 2 and 13) previously bent up by the oscillatory fingers 167 is folded and simultaneously stuck down as in Fig. 11. The blank running out from the pair of rolls 164, 165 is then carried up on to the swingable guide plate 168, while the closure flap $v$ is suction-held by the roll 164, constructed as a suction roll, and thus, when the guide plate 168 has been swung out, the blank is fed with the closure flap fold $f''$ coming foremost, between the rolls 164 and 169 its direction of motion being reversed. The creaser knife 170 assists the closure flap $f''$ to run in properly between the two rolls 164 and 169. After the blank has left the rolls 164 and 169 in finished condition, as shown in Fig. 12, it comes into the range of action of the conveyor discs 171 which are furnished with conveyor lugs and which feed it between their peripheries and the guides 172 to the back of the laying off discs 173 which are formed after the fashion of a screw conveyor; these discs engage it and fed it to their front side so that it is arranged in series against the rear side of the laid-off stack 174.

What we claim is:—

1. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of adhesive and means for applying adhesive to the exposed edges on the other side of the blanks during said further conveyance.

2. In a machine for making envelopes, flat bags and the like from shaped blanks, the combination comprising means for conveying the blanks arranged in stepped formation with the upper blank leading, means for applying adhesive to the exposed edges on one side of the blanks while being so conveyed, means for further conveying the blanks after the application of adhesive with the upper blank leading and means for applying adhesive to the exposed edges on the other side of the blanks during said further conveyance.

3. In a machine for making envelopes, flat bags and the like from shaped blanks, the combination comprising means for conveying the blanks arranged in stepped formation, means for applying adhesive to the exposed edges on one side of the blanks while being so conveyed, means moving at a slightly greater speed than said former conveying means for further conveying the blanks after the application of adhesive and means for applying adhesive to the exposed edges on the other side of the blanks during said further conveyance.

4. In a machine for making envelopes, flat bags, and the like from shaped blanks, the combination comprising means for conveying the blanks arranged in stepped formation, means for applying adhesive which adheres to itself when dry to the exposed edges on one side of the blanks while being so conveyed, means for further conveying the blanks after the application of adhesive and means for applying adhesive which adheres to itself when dry to the exposed edges on the other side of the blanks during said further conveyance.

5. In a machine for making envelopes, flat bags and the like from shaped blanks, the combination comprising means for conveying the blanks arranged in stepped formation with the upper blank leading, means for applying adhesive to the exposed edges on one side of the blanks while being so conveyed, means moving at a slightly greater speed than said former conveying means for further conveying the blanks after the application of adhesive with the upper blank leading and means for applying adhesive to the exposed edges on the other side of the blanks during said further conveyance.

6. In a machine for making envelopes, flat bags and the like from shaped blanks, the combination comprising means for conveying the blanks arranged in stepped formation, an adhesive container having a narrow outlet slit, which rests on the stepped blanks, through which adhesive is applied to the exposed edges on one side of the blanks while being so conveyed, means for further conveying the blanks after the application of adhesive and means for applying adhesive to the exposed edges on the other side of the blanks during said further conveyance.

7. In a machine for making envelopes, flat bags and the like from shaped blanks, the combination comprising means for conveying the blanks arranged in stepped formation, an adhesive container having a narrow outlet slit, which rests on the stepped blanks, through which adhesive is applied to the exposed edges on one side of the blanks while being so conveyed, means moving at a slightly greater speed than said former conveying means for further conveying the blanks after the application of adhesive and means for applying adhesive to the exposed edges on the other side of the blanks during said further conveyance.

8. In an envelope making machine the combination with means for conveying the blanks arranged in stepped formation of means for applying adhesive to the exposed edges on one side of the blanks at one point in their path and of means for applying adhesive to the exposed edges on the other side of the blanks at another point in their path.

9. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of adhesive, means for drying the adhesive applied, and means for applying adhesive to the exposed edges on the other side of the blanks during said further conveyance.

10. In a machine for making envelopes, flat bags and the like from shaped blanks, the combination comprising means for conveying the blanks arranged in stepped formation, an adhesive container having a narrow outlet slit, which rests on the stepped blanks, through which adhesive is applied to the exposed edges on one side of the blanks while being so conveyed, means for further conveying the blanks after the application of adhesive and a second adhesive applying means comprising a container, a dipper roll rotating therein and an applier roll which makes contact with the dipper roll and with the exposed edges on the other side of the blanks during said further conveyance.

11. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of adhesive and a second adhesive applying means comprising a container, a dipper roll rotating therein and an applier roll which makes contact with the dipper roll and with the exposed edges on the other side of the blanks during said further conveyance.

12. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of the adhesive and a second adhesive applying means comprising an adhesive container, a dipper roll rotating therein and an applier roll which rotates in contact with the dipper-roll and with exposed edges on the other side of the blanks during said further conveyance, the direction of movement of said applier roll at the point of contact with blanks being opposite to the direction of movement of the blanks.

13. In a machine for making envelopes, flat bags and the like from shaped blanks, the combination comprising means for conveying the blanks arranged in stepped formation, an adhesive container having a narrow outlet slit, which rests on the stepped blanks, through which adhesive is applied to the exposed edges on one side of the blanks while being so conveyed, means for further conveying the blanks after the application of the adhesive and a second adhesive applying means comprising an adhesive container, a dipper roll rotating therein, and on applier roll which rotates in contact with the dipper roll and with exposed edges on the other side of the blanks during said further conveyance, the direction of movement of said applier roll at the point of contact with blanks being opposite to the direction of movement of the blanks.

14. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of adhesive and a second adhesive applying means comprising an adhesive container, a dipper roll rotating therein, an applier roll which makes contact with the dipper roll and with the exposed edges on the other side of the blanks during said further conveyance and a third roll lying against the dipper roll and adjustable relatively to the applier roll.

15. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of adhesive and a second adhesive applying means comprising a container, a dipper roll rotating therein and an applier roll which makes contact with the dipper roll and with the exposed edges on the other side of the blanks during said further conveyance and means whereby the applier roll is automatically raised from the blanks when the machine is stopped.

16. In a machine for making envelopes, flat bags and the like from shaped blanks, the combination comprising means for conveying the blanks arranged in stepped formation, means for applying adhesive to the exposed edges on one side of the blanks while being so conveyed, means for further conveying the blanks after the application of adhesive and a second adhesive applying means comprising a container, a dipper roll rotating therein and an applier roll which makes contact with the dipper roll and with the exposed edges on the other side of the blanks during said further conveyance and means whereby the applier roll is automatically raised from the blanks but is still rotated when the machine is stopped.

17. In a machine for making envelopes, flat bags and the like from shaped blanks, the combination comprising means for conveying the blanks arranged in stepped formation, an adhesive container having a narrow outlet slit, which as in contact with the stepped blanks, through which adhesive is applied to the exposed edges on one side of the blanks while being so conveyed, means for further conveying the blanks after the application of the adhesive, a second adhesive container having a dipper roll rotating therein, an applier roll rotated from the dipper roll which makes contact with the dipper roll and with the exposed edges on the other side of the blanks during said further conveyance, means whereby the applier roll is automatically removed from contact with the blanks when the machine is stopped and means whereby the applier roll is continued to be rotated while so removed.

18. In a machine for making envelopes, flat bags and the like from shaped blanks, the combination comprising means for holding a stack of blanks, means for removing the blanks from the stack and arranging them one upon another in stepped formation, means for conveying the stepped blanks, means for applying adhesive to the exposed edges on one side of the blanks while being so conveyed, means for further conveying the blanks after the application of the adhesive and means for applying adhesive to the exposed edges on the other side of the blanks during said further conveyance.

19. In a machine for making envelopes, flat bags and the like from shaped blanks, the combination comprising means for holding a stack of blanks, means for removing the blanks from the stack and arranging them one upon another in stepped formation, means for drawing out individual blanks from the stepped pile, means for printing on the individual blanks, means for re-arranging the printed blanks in stepped formation, means for conveying the stepped blanks, means for applying adhesive to the exposed edges on one side of the blanks while being so conveyed, means for further conveying the blanks after the application of the adhesive and means for applying adhesive to the exposed edges on the other side of the blanks during said further conveyance.

20. In a machine for making envelopes, flat bags and the like from shaped blanks, the combination comprising means for holding a stack of blanks, means for removing the blanks from the stack and arranging them one upon another in stepped formation, means for drawing out individual blanks from the stepped pile, means for straightening the individual blanks drawn out, means for printing on the individual blanks, means for re-arranging the printed blanks in stepped formation, means for conveying the stepped blanks, means for applying adhesive to the exposed edges on one side of the blanks while being so conveyed, means for further conveying the blanks after the application of the adhesive and means for applying adhesive to the exposed edges on the other side of the blanks during said further conveyance.

21. In a machine for making envelopes, flat bags and the like from shaped blanks, the combination comprising means for holding a stack of blanks, means for removing the blanks from the stack and arranging them one upon another in stepped formation, means for drawing out individual blanks from the stepped pile, means for producing raised embossing on the edges of the blanks, means for re-arranging the embossed blanks in stepped formation, means for conveying the stepped blanks, means for applying adhesive to the exposed edges on one side of the blanks while being so conveyed, means for further conveying the blanks after the application of the adhesive and means for applying adhesive to the exposed edges on the other side of the blanks during said further conveyance.

22. In a machine for making envelopes, flat bags and the like from shaped blanks, the combination comprising means for holding a stack of blanks, means for removing the blanks from the stack and arranging them one upon another in stepped formation, means for drawing out individual blanks from the stepped pile, means for producing raised embossing on the edges of the blanks, means for printing on the embossed blanks, means for rearranging the embossed and printed blanks in stepped formation, means for conveying the stepped blanks, means for applying adhesive to the exposed edges on one side of the blanks while being so conveyed, means for further conveying the blanks after the application of the adhesive and means for applying adhesive to the exposed edges on the other side of the blanks during said further conveyance.

23. In a machine for making envelopes, flat bags and the like from shaped blanks, the combination comprising means for holding a stack of blanks, means for removing the blanks from the stack and arranging them one upon another in stepped formation, means for drawing out individual blanks from the stepped pile, means for straightening the blanks, means for producing raised embossing on the edges of the blanks, means for printing on the embossed blanks, means for rearranging the embossed and printed blanks in stepped formation, means for conveying the stepped blanks, means for applying adhesive to the exposed edges on one side of the blanks while being so conveyed, means for further conveying the blanks after the application of the adhesive and means for applying adhesive to the exposed edges on the other side of the blanks during said further conveyance.

24. In a machine for making envelopes and the like from shaped blanks, the combination comprising means for holding a stack of blanks, means for withdrawing the blanks from the stack and arranging them one upon another in stepped formation, means for conveying the stepped blanks, an adhesive container having a narrow outlet slit, which is in contact with the blanks, through which adhesive is applied to the exposed edges on one side of the blanks while being so conveyed, means for further conveying the blanks after the application of the adhesive, and a second adhesive container having a dipper roll rotated therein and an applier roll rotated in contact with the dipper roll and with the exposed edges on the other side of the blanks during said further conveyance.

25. In a machine for making envelopes and the like from shaped blanks, the combination comprising means for holding a stack of blanks, means for withdrawing the blanks from the stack and arranging them one upon another in stepped formation, means for drawing out individual blanks from the stepped pile, means for straightening the individual blanks drawn out; means for printing on the individual blanks, means for rearranging the printed blanks in stepped formation, means for conveying the stepped blanks, an adhesive container having a narrow outlet slit, which is in contact with the blanks, through which adhesive is applied to the exposed edges on one side of the blanks while being so conveyed, means for further conveying the blanks after the application of the adhesive, and a second adhesive container having a dipper roll rotated therein and an applier roll rotated in contact with the dipper roll and with the exposed edges on the other side of the blanks during said further conveyance.

26. In a machine for making envelopes and the like from shaped blanks, the combination comprising means for holding a stack of blanks, means for withdrawing the blanks from the stack and arranging them one upon another in stepped formation, means for drawing out individual blanks from the stepped pile, means for producing raised embossing on the edges of the blanks, means for rearranging the embossed blanks in stepped formation, means for conveying the stepped blanks, an adhesive container having a narrow outlet slit, which is in contact with the blanks, through which adhesive is applied to the exposed edges on one side of the blanks while being so conveyed, means for further conveying the blanks after the application of the adhesive and a second adhesive container having a dipper roll rotated therein and an applier roll rotated in contact with the dipper roll and with the exposed edges on the other side of the blanks during said further conveyance.

27. In a machine for making envelopes and the like from shaped blanks, the combination comprising means for holding a stack of blanks, means for withdrawing the blanks from the stack and arranging them one upon another in stepped formation, means for drawing out the individual blanks from the stepped pile, means for producing raised embossing on the edges of the blanks, means for printing on the embossed blanks, means for rearranging the embossed and printed blanks in stepped formation, means for conveying the stepped blanks, an adhesive container having a narrow outlet slit, which is in contact with the blanks, through which adhesive is applied to the exposed edges on one side of the blanks while being so conveyed, means for further conveying the blanks after the application of the adhesive, and a second adhesive container having a dipper roll rotated therein and an applier roll rotated in contact with the dipper roll and with the exposed edges of the other side of the blanks during said further conveyance.

28. In a machine for making envelopes and the like from shaped blanks, the combination comprising means for holding a stack of blanks, means for withdrawing the blanks from the stack and arranging them one upon another in stepped formation, means for conveying the stepped blanks, an adhesive container having a narrow outlet slit, which is in contact with the blanks, through which adhesive is applied to the exposed edges on one side of the blanks while being so conveyed, means moving at a slightly greater speed than said former conveying means for further conveying the blanks after the application of the adhesive, and a second adhesive container having a dipper roll rotated therein and an applier roll rotated in contact with the dipper roll and with the exposed edges on the other side of the blanks during said further conveyance.

29. In a machine for making envelopes, flat bags and the like, the combination comprising means for conveying the blanks arranged in stepped formation, means for applying adhesive to the exposed edges on one side of the blanks while being so conveyed, means for further conveying the blanks after the application of adhesive, means for applying adhesive to the exposed edges on the other side of the blanks during the said further conveyance, and means for folding back the said latter edges of the blanks to which the adhesive has been applied.

30. In a machine for making envelopes and the like from shaped blanks, the combination comprising means for holding a stack of blanks, means for withdrawing the blanks from the stack and arranging them one upon another in stepped formation, means for conveying the stepped blanks, an adhesive container having a narrow outlet slit, which is in contact with the blanks, through which adhesive is applied to the exposed edges on one side of the blanks while being so conveyed, means for drying the adhesive applied, means for further conveying the blanks after the application of the adhesive, and a second adhesive container having a dipper roll rotated therein and an applier roll rotated in contact with the dipper roll and with the exposed edges on the other side of the blanks during said further conveyance, and means for drying the adhesive applied to said latter edges.

31. In a machine for making envelopes, flat bags and the like, the combination comprising means for conveying the blanks arranged in stepped formation, means for applying adhesive to the exposed edges on one side of the blanks while being so conveyed, means for drying the adhesive applied, means for further conveying the blanks after the application of adhesive, means for applying adhesive to the exposed edges on the other side of the blanks during the said further conveyance, means for drying the adhesive applied to said latter edges, and means for folding back the said latter edges of the blanks to which the adhesive has been applied.

32. In a machine for making envelopes and the like from shaped blanks, the combination comprising means for holding a stack of blanks, means for withdrawing the blanks from the stack and arranging them in stepped formation one upon another, means for withdrawing blanks singly from the stepped pile, means for straightening the single blanks, means for printing on the blanks, means for rearranging the printed blanks in stepped formation, means for conveying the blanks, means for applying adhesive to the exposed edges on one side of the blanks while being so conveyed, means for drying the adhesive applied, means for further conveying the blanks, means for applying adhesive to the exposed edges on the other side of the blanks during said further conveyance, means for drying the adhesive on said latter exposed edges, means for folding back the said latter edges, means for folding over and attaching the side flaps to the back and means for folding over the closure flap.

33. In a machine for making envelopes and the like from shaped blanks, the combination comprising means for holding a stack of blanks, means for withdrawing the blanks from the stack and arranging them in stepped formation one upon another, means for withdrawing blanks singly from the stepped pile, means for straightening the single blanks, means for producing raised embossing on one edge of the blanks, means for printing on the blanks, means for rearranging the printed blanks in stepped formation, means for conveying the blanks, means for applying adhesive to the exposed edges on one side of the blanks while being so conveyed, means for drying the adhesive applied, means for further conveying the blanks, means for applying adhesive to the exposed edges on the other side of the blanks during said further conveyance, means for drying the adhesive on said latter exposed edges, means for folding back the said latter edges, means for folding over and attaching the side flaps to the back and means for folding over the closure flap, and means for stacking the finished envelopes.

34. In a process for making envelopes, flat bags and the like from shaped blanks, the method comprising conveying the blanks arranged in stepped formation, applying adhesive to the exposed edges on one side of the blanks while being so conveyed, further conveying the blanks after the application of adhesive and applying adhesive to the exposed edges on the other side of the blanks during said further conveyance.

MAX DÜNNEBIER.
ALFRED WINKLER.